United States Patent
Li et al.

(10) Patent No.: US 9,754,356 B2
(45) Date of Patent: Sep. 5, 2017

(54) METHOD AND SYSTEM FOR PROCESSING AN INPUT IMAGE BASED ON A GUIDANCE IMAGE AND WEIGHTS DETERMINED THEREFORM

(71) Applicant: Agency for Science, Technology and Research, Singapore (SG)

(72) Inventors: Zhengguo Li, Singapore (SG); Jinghong Zheng, Singapore (SG); Zijian Zhu, Singapore (SG); Shiqian Wu, Singapore (SG); Wei Yao, Singapore (SG); Susanto Rahardja, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 14/783,763

(22) PCT Filed: Apr. 11, 2014

(86) PCT No.: PCT/SG2014/000162
§ 371 (c)(1),
(2) Date: Oct. 9, 2015

(87) PCT Pub. No.: WO2014/168587
PCT Pub. Date: Oct. 16, 2014

(65) Prior Publication Data
US 2016/0292824 A1    Oct. 6, 2016

(30) Foreign Application Priority Data
Apr. 12, 2013    (SG) .................................. 201302802

(51) Int. Cl.
G06K 9/00    (2006.01)
G06T 5/00    (2006.01)
(Continued)

(52) U.S. Cl.
CPC ............... *G06T 5/00* (2013.01); *G06T 3/20* (2013.01); *G06T 5/002* (2013.01); *G06T 5/003* (2013.01);
(Continued)

(58) Field of Classification Search
None
See application file for complete search history.

(56) References Cited

U.S. PATENT DOCUMENTS 7,146,059 B1    12/2006 Durand et al.
2007/0274605 A1*    11/2007 Yahil .................. G06K 9/40
382/275
(Continued)

OTHER PUBLICATIONS

He, Kaiming, Jian Sun, and Xiaoou Tang. "Guided image filtering." European conference on computer vision. Springer Berlin Heidelberg, 2010.*
(Continued)

*Primary Examiner* — Hadi Akhavannik
(74) *Attorney, Agent, or Firm* — K. David Crockett, Esq.; Niky Economy Syrengelas, Esq.; Crockett & Crockett, PC (57) ABSTRACT

In various embodiments of the present disclosure, there is provided a method for processing an input image. The method includes generating a base layer portion and a detail layer portion from the input image by carrying out a linear transformation of pixels of a guidance image, and determining, for each of the pixels of the guidance image, a variance of the pixels in a surrounding window of pixels. Further, the method includes determining, for each of the pixels of the guidance image, a weight value of the pixels based on the determined variance, wherein the pixels are weighted in the linear transformation according to the determined weight value. Accordingly, a system for processing an input image is also provided.

16 Claims, 8 Drawing Sheets

(51) Int. Cl.
*G06T 5/50* (2006.01)
*H04N 1/409* (2006.01)
*G06T 3/20* (2006.01)
*G06T 7/13* (2017.01)

(52) U.S. Cl.
CPC ............... *G06T 5/50* (2013.01); *G06T 7/13* (2017.01); *H04N 1/4092* (2013.01); *G06T 2207/10016* (2013.01); *G06T 2207/20012* (2013.01); *G06T 2207/20024* (2013.01); *G06T 2207/20028* (2013.01); *G06T 2207/20076* (2013.01); *G06T 2207/20192* (2013.01)

(56) References Cited

U.S. PATENT DOCUMENTS

| | | | | |
|---|---|---|---|---|
| 2008/0169912 | A1* | 7/2008 | Kawasaki | G06K 9/00825 340/425.5 |
| 2010/0290703 | A1* | 11/2010 | Sim | G06T 5/008 382/172 |
| 2011/0211758 | A1* | 9/2011 | Joshi | G06T 5/003 382/167 |

OTHER PUBLICATIONS

Yang, Recursive Bilateral Filtering, 7572 European Conference on Computer Vision, 399 (2012).

Rudin, et al., Nonlinear Total Variation Based Noise Removal Algorithms, 60 Physica D, 259 (1992).

Farbman, et al., Edge-Preserving Decompositions for Multi-Scale Tone and Detail Manipulation, 27 ACM Transactions on Graphics, 249 (Aug. 2008).

Li, et al., Detail-Enhanced Exposure Fusion, 21 IEEE Trans. on Image Processing, 4672 (Nov. 2012).

Fattal, et al., Multiscale Shape and Detail Enhancement from Multi-Light Image Collections, 26 ACM Transactions on Graphics, 51:1 (Aug. 2007).

He, et al., Guided Image Filtering, 35 IEEE Trans. on Pattern Analysis and Machine Intelligence, 1397 (Jun. 2013).

Xu, et al., Image Smooting via L0 Graident Minimization, 30 ACM Transactions on Graphics, (Dec. 2011).

Tomasi, et al., Bilateral Filtering for Gray and Color Images, In Proc. IEEE Int. Conf. on Computer Vision, 839 (1998).

Durand, et al., Fast Bilateral Filtering for the Display of High-Dynamic-Range Images, 21 ACM Transactions on Graphics, 257 (Aug. 2002).

Canny, A Computational Approach to Edge Detection, 8 IEEE Trans. on Pattern Analysis and Machine Intelligence, 579 (Nov. 1986).

Chen, et al., Real-Time Edge-Aware Image Processing with the Bilateral Grid, 26 ACM Transactions on Graphics, 1 (Aug. 2007).

Petschnigg, et al., Digital Potograhy with Flash and No-Flash Image Pairs, 22 ACM Transactions on Graphics, 1 (Aug. 2004).

Eisemann, et al., Flash Photography Enhancement Via Intrinsic Relighting, 22 ACM Transactions on Graphics, 1 (Aug. 2004).

Narasimhan, et al., Chromatic Framework for Vision in Bad Weather, IEEE Conf. Computer Vision and Pattern Recognition (2000).

Tan, Visibility in Bad Weather from a Single Image, IEEE Conf. Computer Vision and Pattern Recognition (2008).

He, et al., Single Image Haze Removal Using Dark Channel Prior, 33 IEEE Trans. on Pattern Analysis and Machine Intelligence, 2341 (Dec. 2011).

Fattal, Single Image Dehazing, SIGGRAPH, 19 (2008).

Kopf, et al., Deep Photo: Model-Based Photograph Enhancement and Viewing, 27 ACM Transactions on Graphics, (Dec. 2008).

* cited by examiner

METHOD AND SYSTEM FOR PROCESSING AN INPUT IMAGE BASED ON A GUIDANCE IMAGE AND WEIGHTS DETERMINED THEREFROM

CROSS-REFERENCE TO RELATED APPLICATIONS

The present application claims the benefit of Singapore patent application no. 201302802-2, filed on 12 Apr. 2013, the entire contents of which are incorporated herein by reference for all purposes.

TECHNICAL FIELD

The present disclosure describes embodiments generally relating to a method of processing an input image. Further, a system for processing an input image is provided.

BACKGROUND

In digital image processing, for example computational photography and image processing, computer-based algorithms provide for manipulations in digital images. For example, digital image processing allows for features such as classification, feature extraction, or pattern recognition to be carried out in digital imaging applications. Further, many applications in the field of digital image processing require edge-preserving smoothing. Such applications can include de-noising of images, tone mapping of high dynamic range (HDR) images, fusion of differently exposed low dynamic range (LDR) images, detail enhancement via multi-light images, texture transfer, and single image haze removal.

Image processing to address the edge-preserving smoothing problem can be carried out with digital filters. Digital filters are classified as either global or local, where a global digital filter processes each using all pixels of an input image, while a local digital filter surveys every pixel in the image using pixels from a neighborhood of the pixel. Similarly, the edge-preserving smoothing problem can be addressed globally or locally. Global optimization-based approaches often yield high state-of-the-art quality, but require an expensive computational cost. Local filtering methods are generally simpler, but are typically unable to preserved sharp edges as well as that achieved through the global optimization based filters.

It is thus desired for an alternative digital image processing solution which may provide a result with quality as from a global optimization approach, but without the heavy computational cost required.

SUMMARY

According to various embodiments in the present disclosure, there is provided a method for processing an input image, the input image including a plurality of pixels, the method including: generating a base layer portion and a detail layer portion from the input image by carrying out a linear transformation of pixels of a guidance image; determining, for each of the pixels of the guidance image, a variance of the pixel centered in a surrounding window of pixels; and determining, for each of the pixels of the guidance image, a weight value of the pixel based on the determined variance; wherein the pixels are weighted in the linear transformation according to the determined weight value.

According to various embodiments in the present disclosure, there is provided a system for processing an input image, the input image comprising a plurality of pixels, the system including: a linear transformation module configured to carry out a linear transformation of pixels of a guidance image in generating a base layer portion and a detail layer portion from the input image; a variance determination module configured to determine, for each of the pixels of the guidance image, a variance of the pixel centered in a surrounding window of pixels; and a weightage module configured to determine, for each of the pixels of the guidance image, a weight value of the pixel based on the determined variance; wherein the pixels are weighted in the linear transformation according to the determined weight value.

According to various embodiments in the present disclosure, there is provided a computer program readable medium having a program recorded thereon, wherein the program is executed to make a computer process an input image, the input image including a plurality of pixels, the computer readable medium including: instructions for generating a base layer portion and a detail layer portion from the input image by carrying out a linear transformation of pixels of a guidance image; instructions for determining, for each of the pixels of the guidance image, a variance of the pixel centered in a surrounding window of pixels; and instructions for determining, for each of the pixels of the guidance image, a weight value of the pixel based on the determined variance of the pixel; wherein the pixels are weighted in the linear transformation according to the determined weight value.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Embodiments of a method of processing an input image and a system for processing an input image are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a system or apparatus which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of a system or apparatus.

In embodiments, the system for processing an input image may comprise a memory which is for example used in the processing carried out by the system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" or a "module" may be understood as any kind of a logic implementing entity, which may be special purpose circuitry or a processor executing software stored in a memory, firmware, or any combination thereof. Thus, in an embodiment, a "circuit" or a "module" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" or a "module" may also be a processor executing software, e.g. any kind of computer program, e.g. a computer program using a virtual machine code such as e.g. Java. Any other kind of implementation of the respective functions which will be described in more detail below may also be understood as a "circuit" or a "module" in accordance with an alternative embodiment.

According to various embodiments in the present disclosure, there is provided a method for processing an input image, the input image including a plurality of pixels, the method including: generating a base layer portion and a detail layer portion from the input image by carrying out a linear transformation of pixels of a guidance image; determining, for each of the pixels of the guidance image, a variance of the pixel centered in a surrounding window of pixels surrounding the pixel; and determining, for each of the pixels of the guidance image, a weight value of the pixel based on the determined variance of the pixel; wherein the pixels are weighted in the linear transformation according to the determined weight value.

Such a method of processing is carried out in view of a digital filter. In embodiments, the digital filter is a guided filter, provided for the addressing of an edge-preserving and smoothing solution in an input image.

According to various embodiments, a guided filter is utilized, which allows for additional information incorporated from a given guidance image during the filtering process. In some state of the art filtering process, for example the bilateral filter, the filter kernel is built utilizing such a guidance image. The bilateral filter is typically effective in various situations. However, utilization of the bilateral filter may give rise to unwanted gradient reversal artifacts.

In a guided filter, the filtering output is a linear transform of the guidance image, and provides an edge-preserving smoothing property much like the bilateral filter, but is able to overcome the introduction of unwanted gradient reversal artifacts. Further, a guided filter can be considered one of the fastest edge-preserving smoothing filters.

However, it has been observed that the bilateral filter, as well as a regular guided filter, has a common limitation, in that the results of which exhibit halo artifacts near some edges or boundaries due to unwanted smoothing of the edges.

According to embodiments, the guided filter is a content adaptive guided filter, and such a filter is provided which takes into consideration human visual perception. In human visual perception, edges are effective and expressive stimulation that is vital for neural interpretation of a scene. The points at which image brightness change sharply are typically organized into sets of curved line segments termed edges. An edge pixel is thus a pixel on such a line segment. In the present disclosure, flat pixels are defined to be pixels in smooth or flat areas, or otherwise pixels that are not edge pixels. According to embodiments, greater emphasis or larger weights are thus assigned to pixels at edges than pixels in smooth areas, or flat pixels. The filter is thus capable of adapting to the processed content, accentuating edge pixels from flat pixels.

The inputs of the content adaptive guided filter, according to various embodiments, are a guidance image and an input image to be filtered. By explicitly building both the guidance image and edge-aware weights into the filter kernels, the proposed content adaptive guided filter preserves sharp edges and smoothes flat areas well as well as avoids gradient reversal.

In embodiments, in assigning weights to each pixel under processing, weights are computed using local variances of windows of each pixel. According to embodiments, a 3×3 window of pixels is provided, centered about a pixel under processing, in determining variance. This is based on an observation that local variance of a pixel at an edge is usually larger than that of a pixel in a flat area.

As indicated, the proposed guided filter preserves sharp edges and smoothes flat areas well as well as avoids gradient reversal. These features allow many applications of the proposed guided filter. For example, the content adaptive guided image filter can be adopted to study detail enhancement of conventional images and single image haze removal. Experimental results show that a resultant detail enhancement algorithm can produce images with better visual quality. Further, a resultant haze removal algorithm can produce sharper images than those carried out in the art, and artifacts in for example the sky region can be avoided.

The technical basis of providing for and carrying out a content adaptive guided image filtering is now discussed.

According to embodiments, the task of edge-preserving smoothing is to decompose an input image X(p) into two parts as follows:

$$X(p) = \hat{Z}(p) + e(p) \tag{1}$$

Figure 1:
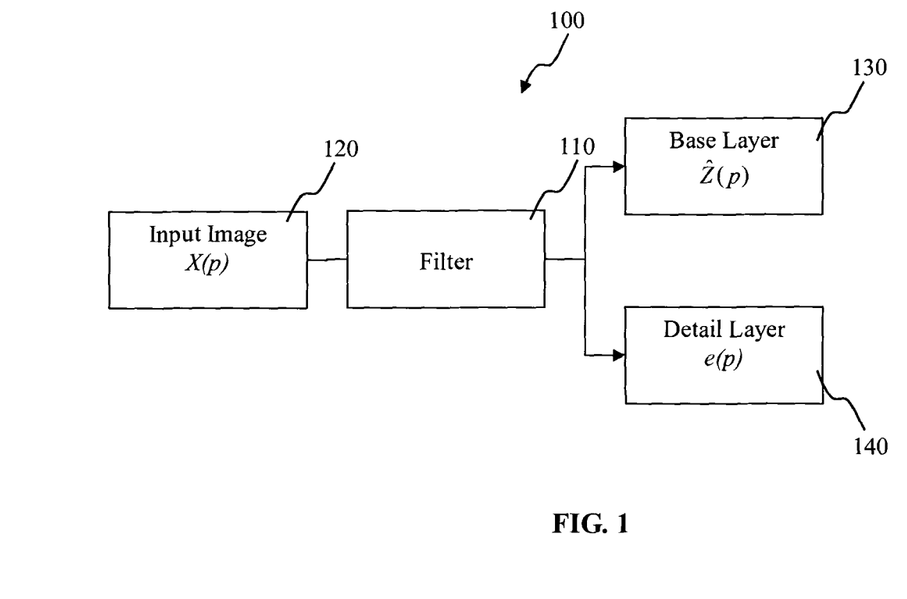
FIG. 1 illustrates a block diagram of a system for carrying out an edge-preserving smoothing according to an exemplary embodiment.

FIG. 1 illustrates a block diagram of a system for carrying out an edge-preserving smoothing according to an exemplary embodiment. System 100 includes a filter 110, the filter 110 for carrying out an image processing on a digital input image. Correspondingly, the filter 110 is a digital filter, arranged to carry out an image processing on a digital input image. Input 120 is introduced to the filter 110 in the system 10. In embodiments, the input 120 is a digital image, including a plurality of pixels forming together the digital image of the input 120. Input image 120 is denoted as X(p) in the present exemplary embodiment. It is noted that the system 100 accommodates for the processing of the input image 120 with respect to individual pixels p in the input image 120.

In embodiments, the filter 110 carries out an image filter processing method or process or scheme, on the input image 120 received in the filter 110. Filter 110 thereafter generates two outputs—a base layer portion 130 and a detail layer portion 140. In the present exemplary embodiment, the base layer portion 130 is denoted as $\hat{Z}(p)$ while the detail layer portion 140 is denoted as e(p). According to an embodiment, the system 10 carries out an edge-preserving smoothing digital filter process with filter 110 to decompose an input image 120, X(p), to a base layer portion 130, $\hat{Z}(p)$, and a detail layer portion 140, e(p).

The base layer portion 130, $\hat{Z}(p)$, is a reconstructed image formed by homogeneous regions with sharp edges, while the detail layer portion 140, e(p), is characterized by texture and noise. In various embodiments, it is desired for the reconstructed image, $\hat{Z}(p)$, to be as close to the input image as possible. In edge-preserving smoothing processes, edge pixels are typically considered in the base layer computations, while flat pixels are typically considered in the detail layer computations as they carry either noise or small scale texture.

Figure 2:
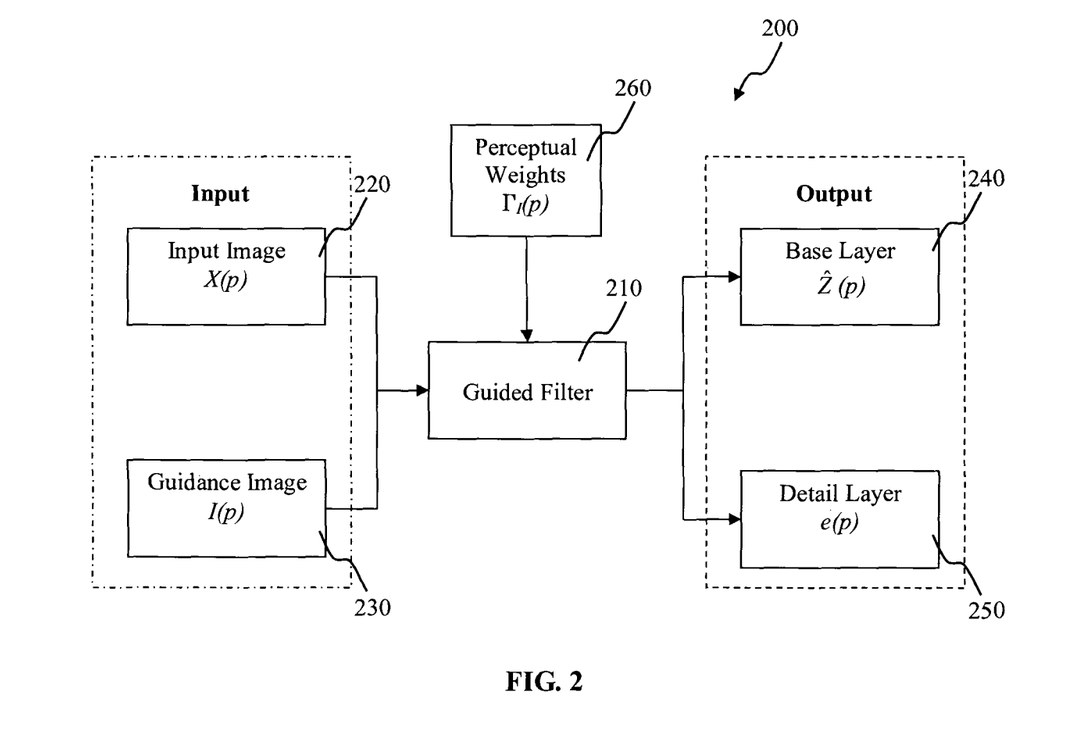
FIG. 2 illustrates a block diagram of a system for carrying out an edge-preserving smoothing according to a further embodiment in the present disclosure.

FIG. 2 illustrates a block diagram of a system for carrying out an edge-preserving smoothing according to a further embodiment in the present disclosure. System 200 includes a filter 210 for carrying out an image processing on a digital input image. Correspondingly, the filter 210 is a digital filter, arranged to carry out an image processing on a digital input image. Input 220 is introduced into the system 200, and is provided to the filter 240. In embodiments, the input 220 is a digital image, including a plurality of pixels forming together the digital image of the input 220. Input image 220 is denoted as X(p) in the present embodiment.

According to various embodiments, the system 200, and particularly the filter 210, is provided with a reference or a guidance image 230 to provide additional information which can be incorporate with the filtering process to obtain a better output. According to embodiments, the filter 210 is a guided filter, which utilizes information from a guidance image 230, and determines a corresponding output therefrom. The outputs of the filter 210, and thereafter the system 200, are the base layer portion 240 and the detail layer portion 250. As indicated above, the base layer portion is also understood to be the reconstructed image. In FIG. 2, the guided image 230 is denoted as I(p).

According to various embodiments, the guidance image 230 can be identical to the input image 220. According to embodiments, the reconstructed image 230, $\hat{Z}$, is a linear transform of the guidance image 230 in a window $\Omega_\rho(p'')$:

$$\hat{Z}(p) = a_{p''} I(p) + b_{p''}, \forall p \in \Omega_\rho(p'') \tag{2}$$

where $\Omega_\rho(p'')$ is a square window centered at the pixel $p''$ of a radius $\rho$ of the input image, and $a_{p''}$ and $b_{p''}$ are linear coefficients which are assumed to be constant in the window $\Omega_{\rho(p'')}$.

Such a local linear transformation or a model describing the filter behavior seeks to closely reproduce the reconstructed image with respect to the input image. The above model as set out in Equation (2) can provide such a close reproduction as desired. In embodiments, the linear transformation assures that the reconstructed image has an edge only if the guidance image has an edge. This can be observed where $\nabla \hat{Z}(p) = a_{p''} \nabla I(p)$. According to embodiments, the values of the linear coefficients $a_{p''}$ and $b_{p''}$ can be determined by minimizing the difference between the reconstructed image 240 and the guidance image 220.

According to various embodiments, the linear coefficients are determined by minimizing the cost function, $E(a_{p''}, b_{p''})$, of the filter 210. According to various embodiments, the cost function can be expressed by the following equation:

$$\sum_{p \in \Omega_\rho(p'')} [(a_{p''} I(p) + b_{p''} - X(p))^2 + \lambda a_{p''}^2] \tag{3}$$

where $\lambda$ is a regularization parameter, which prevents the coefficient $a_{p''}$ from growing too large. In Equation (3), the set of terms $(a_{p''} I(p) + b_{p''} - X(p))^2$ can be considered the data terms, which indicates fidelity, while the term $\lambda a_{p''}^2$ can be considered the regularization term, which indicates smoothness.

A linear ridge regression model is used to determine the coefficients, $a_{p''}$ and $b_{p''}$, the resultant equations provided as follows:

$$a_{p''} = \frac{\text{cov}_{I,X,\rho}(p'')}{\sigma_{I,\rho}^2(p'') + \lambda} \tag{4}$$

where $\text{cov}_{I,X,\rho}$ is the covariance of X and I in the window $\Omega_\rho(p'')$, and $\sigma_{I,\rho}^2(p'')$ is the variance of I in the window $\Omega_\rho(p'')$. Equation (4) can be further established as:

$$a_{p''} = \frac{\frac{1}{|\Omega_\rho(p'')|} \sum_{p \in \Omega_\rho(p'')} I(p) X(p) - \mu_{I,\rho}(p'') \mu_{X,\rho}(p'')}{\sigma_{I,\rho}^2(p'') + \lambda} \tag{5}$$

where $\mu_{I,\rho}(p'')$ and $\mu_{X,\rho}(p'')$ are respectively the mean values of I and X, and $|\Omega_\rho(p'')|$ is the cardinality of $\Omega_\rho(p'')$, or the number of pixels in the window. Coefficient $b_{p''}$ can be expressed as follows:

$$b_{p''} = \mu_{X,\rho}(p'') - a_{p''} \mu_{I,\rho}(p'') \tag{6}$$

Thereafter, the linear model is applied to all local windows in the entire input image 220. It is worth noting that a pixel p is involved in all overlapping windows $\Omega_\rho(p'')$'s that contain the pixel p. As such, there are various different values of $\hat{Z}(p)$, due to $\hat{Z}(p)$ varying when computed in the different windows with respect to pixel p. A simple method to address such a situation is to average all the possible values of $\hat{Z}(p)$ as follows:

$$\hat{Z}(p) = \bar{a}_p I(p) + \bar{b}_p \quad (7)$$

According to embodiments, $\bar{a}_p$, and $b_p$ are computed as:

$$\bar{a}_p = \frac{1}{|\Omega_\rho(p)|} \sum_{p'' \in \Omega_\rho(p)} a_{p''} \quad (8)$$

$$\bar{b}_p = \frac{1}{|\Omega_\rho(p)|} \sum_{p'' \in \Omega_\rho(p)} b_{p''} \quad (9)$$

It can be observed from Equations (8) and (9) that the linear coefficients $\bar{a}_p$ and $\bar{b}_p$ vary spatially, which thus leads to the reconstructed image $\hat{Z}$ no longer scaling of the guidance image I. However, since the linear coefficients $\bar{a}_p$ and $\bar{b}_p$ are the output of an average filter, their gradients would be smaller than that of the guidance image I near strong edges. The abrupt intensity changes in guidance image I 220 can mostly be maintained in the reconstructed image $\hat{Z}$ 240.

According to various embodiments, a perceptual weight 260, or an edge-aware weight, is further introduced with and in the filter 210. The perceptual weight 260 is provided to accentuate the difference in the reconstructed image 240 between an edge pixel and a flat pixel. In formulating the perceptual weight, variance of pixel values is considered. In an exemplary illustration, two pixels p and p' are identified in a guidance image I, where I(p) is at an edge, while I(p') is in a flat area. Typically, the value of $\sigma_{I,1}^2(p)$ is larger than that of $\sigma_{I,1}^2(p')$, i.e. the variance of an edge pixel in a window, in this case with a radius of 1, is generally larger than the variance of a flat pixel in a similarly sized window. Based on this observation, perceptual weights of all pixels in the guidance image are computed by using local variances of all pixels.

According to various embodiments, a perceptual weight 260 to be provided for processing with the filter 210 can be expressed as:

$$\Gamma_I(p'') = \frac{1}{N} \sum_{p'=1}^{N} \frac{\sigma_{I,1}^2(p'') + c_1}{\sigma_{I,1}^2(p') + c_1} \quad (10)$$

where N is the total number of pixels in an image, $c_I$ is a small positive constant. According to embodiments, $c_I$ is provided as $(0.001*L)^2$, where L is the dynamic range of guidance image I. As can be noted in Equation (10), the perceptual weight $\Gamma_I(p'')$ can be understood to be an averaged summation of ratio of the variance of a present pixel p'' with the variance of every other pixel in the image. It is also noted in the above Equation (10) that the determination of the perceptual weight introduces very little computational load. This is as the variance of each pixel has already been determined during the guided filter processing in solving for the linear coefficient $a_{p''}$.

According to various embodiments, the value of $\Gamma_I(p'')$ is usually larger than 1 if p'' is at an edge, and smaller than 1 if p'' is in a smooth area. It is thus noted that pixels at edges include a larger weight, while those pixels in flat areas.

In an embodiment, in providing the perceptual weight 260 of all pixels in the image, an additional step of smoothing the determined weights is carried out. After all the perceptual weights $\Gamma_I(p'')$ are determined, a filter process is carried to provide a smoothing of the weights. In an embodiment, a Gaussian filter is used to smooth the values of the determined perceptual weights. Providing such a smoothing step allows for the reduction of possible blocking artifacts in a resultant reconstructed image. Blocking artifacts are commonly formed due to image compression issues or can arise in other image processing situations.

In various embodiments, further processing can be carried out on the base layer portion 240 and the detail layer portion 250, in multiple image processing applications, to generate a resultant image. For example, the system 200 for processing an input image with an edge-aware guided filter 210 can be used in applications such as detail enhancement, de-hazing a hazy input image, de-nosing an input image, HDR tone mapping, tone transfer, and various other relevant applications.

Figure 3A:
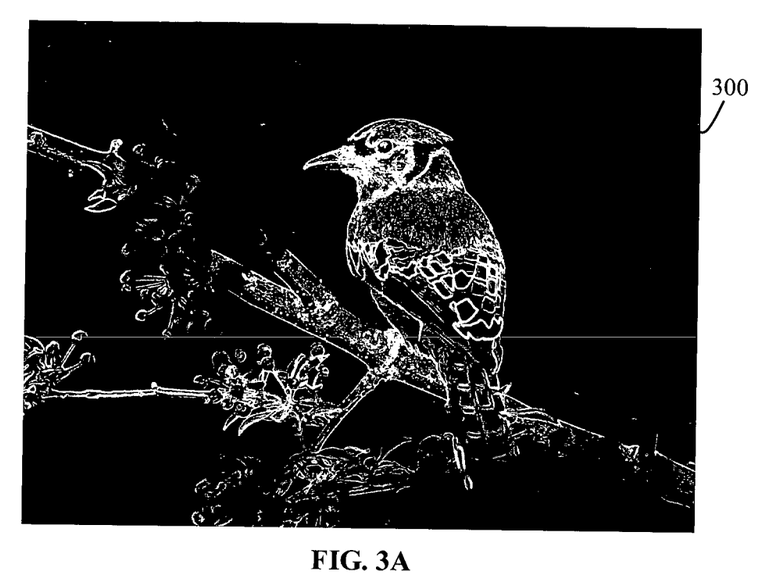
FIG. 3A illustrates an exemplary image formed by the values of the determined perceptual weights according to an embodiment.

FIG. 3A illustrates an exemplary image formed by the values of the determined perceptual weights according to an embodiment. In image 300, the luminance of each pixel location is correlated to the determined perceptual weight of the pixel. Where the perceptual weight is greater than 1, the pixel is illuminated, and where the perceptual weight is smaller than 1, the pixel is darkened. The resultant image 300 indicates the relative accuracy of identification of edge pixels, and serves to accentuate the difference between an edge pixel and a flat pixel.

Figure 3B:
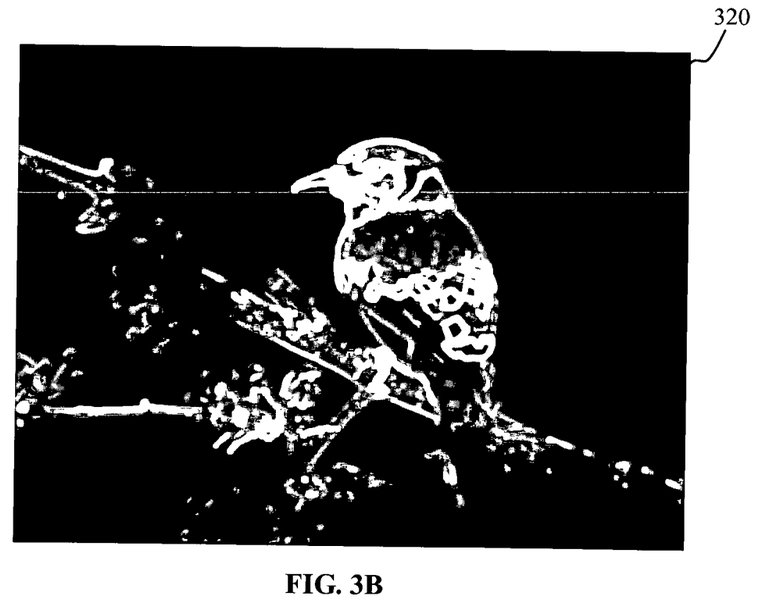
FIG. 3B illustrates an exemplary image formed by a smoothing of the determined perceptual weights of FIG. 3A.

FIG. 3B illustrates an exemplary image formed by a smoothing of the determined perceptual weights of FIG. 3A. In obtaining image 320, a Gaussian filter is used to make smooth the determined perceptual weights. As can be observed from image 320, the resultant lines are no longer as sharp as compared with image 300. However, such a smoothing is useful in further processing of the image coupled with the perceptual weights, as block artifact formation could arise due to the sharp distinction in neighboring pixel values.

Returning to FIG. 2, when the perceptual weights are determined, and in certain embodiments smoothed, and provided to the filter 210, the perceptual weights are integrated into the image filter processing methodology. Operation of the guided filter 210 is slightly modified to take into account the presence of perceptual weights.

To determine the linear coefficients $\bar{a}_p$ and $\bar{b}_p$, a constraint is added to X and $\hat{Z}$ as in Equation (1). The solution is obtained by minimizing the difference between X and $\hat{Z}$ while maintaining the linear model as expressed in Equation (2), i.e. by minimizing the following cost function:

$$\sum_{p \in \Omega_\rho(p'')} [\Gamma_I(p'')(a_{p''} I(p) + b_{p''} - X(p))^2 + \lambda a_{p''}^2] \quad (11)$$

It can be observed in the linear model as expressed in Equation (2) that $\nabla \hat{Z}(p) = a_{p''} \nabla I(p)$. It is thus derived that the smoothness of $\hat{Z}$ in window $\Omega_\rho(p'')$ depends on the value of $a_{p''}$. The data term measures the fidelity of the reconstructed image $\hat{Z}$ 240 with respect to the input image X 210, and the regularization term indicates the smoothness of the reconstructed image $\hat{Z}$ 240.

In minimizing the cost function, it can be observed that if the guidance image I 230 in the window $\Omega_\rho(p'')$ is complex, the determined perceptual weight $\Gamma_I(p'')$ can be derived to be greater than 1, which indicates a higher fidelity f the reconstructed image $\hat{Z}$ 240 with respect to the input image X 210. In this case, the sharp edges in the image are preserved through the use of the edge-aware guided filter according to embodiments.

If the guidance image I 230 in the window $\Omega_\rho(p'')$ is flat, the determined perceptual weight $\Gamma_I(p'')$ can be derived to be smaller than 1, which indicates better smoothness of the reconstructed image $\hat{Z}$ 240. In this case, the flat areas in the image are smoothened through the use of the edge-aware guided filter according to embodiments.

The difference in Equation (3) for a cost function of a guided filter without a perceptual weightage, and Equation (11) for a cost function of a guided filter with an edge-aware perceptual weightage can be understood to be at least that 1) the fidelity of the reconstructed image $\hat{Z}$ 240 with respect to the input image X 210 is required to be higher by the edge-aware filter in Equation (11) if the pixel p'' is at an edge, where $a_{p''} \approx 1$ and $b_{p''} \approx 0$, and $a_{p''}$ is closer to 1; and 2) the reconstructed image $\hat{Z}$ 240 is required to be smoother by the edge-aware filter in Equation (11) if the pixel p'' is in a flat area, where $a_{p''} \approx 0$ and $b_{p''} \approx \mu_{X,\rho}(p'')$, $a_{p''}$ is closer to 0. It is thus observed that the edge-aware guided filter according to present embodiments has a better potential to preserve sharp edges and smooth flat regions. Advantageously, such an edge-aware guided filter as according to various embodiments can be very useful in considering human visual system features, where pixels in sharp edges are usually more important than those in flat areas.

According to embodiments, the linear coefficient $a_{p''}$ is now computed as:

$$a_{p''} = \frac{\Gamma_I(p'') \text{cov}_{I,X,\rho_1}(p'')}{\Gamma_I(p'') \sigma^2_{I,\rho_1}(p'') + \lambda} \tag{12}$$

which can be further expressed as:

$$a_{p''} = \frac{\frac{1}{|\Omega_\rho(p'')|} \sum_{p \in \Omega_\rho(p'')} I(p)X(p) - \mu_{I,\rho}(p'')\mu_{X,\rho}(p'')}{\sigma^2_{I,\rho}(p'') + \frac{\lambda}{\Gamma_I(p'')}} \tag{13}$$

Linear coefficient $b_{p''}$ is now expressed as:

$$b_{p''} = \mu_{X,\rho}(p'') - a_{p''}\mu_{I,\rho}(p'') \tag{14}$$

The final value of $\hat{Z}(p)$ is thereafter obtained by averaging all values of $\hat{Z}(p)$'s as with earlier indicated Equations (7)-(9).

Figure 4:
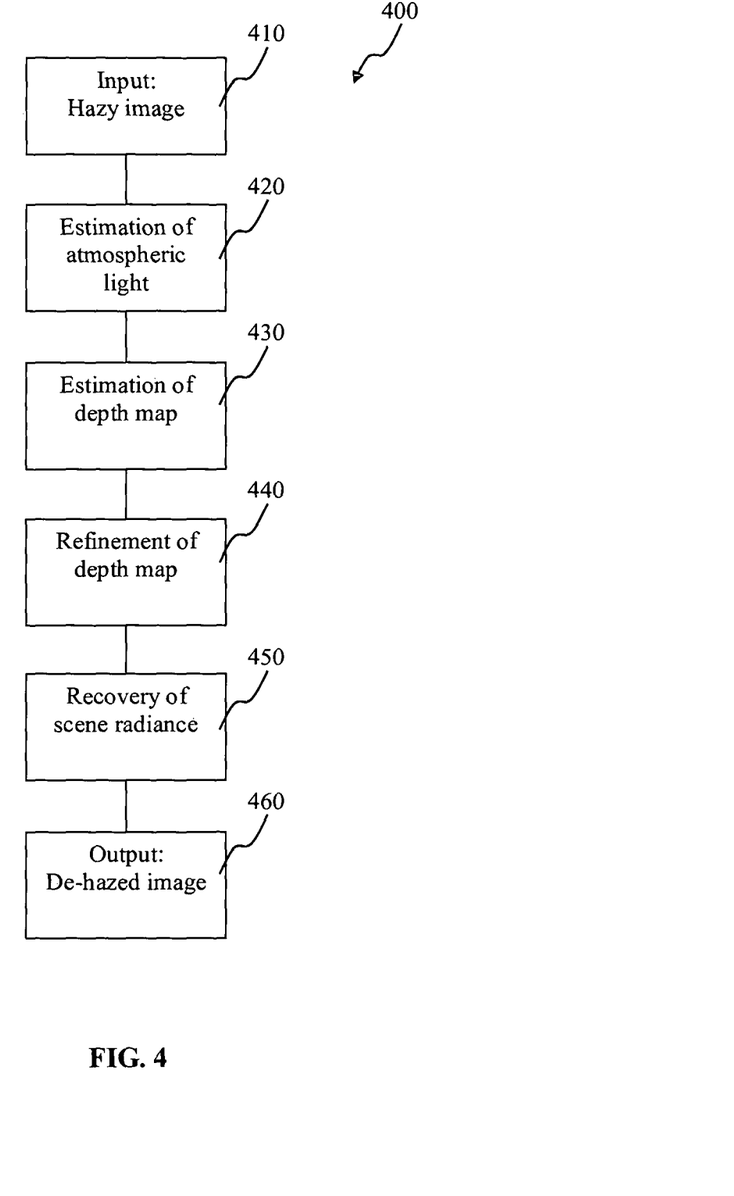
FIG. 4 illustrates a flow diagram of a method of haze removal of an input image according to an embodiment of the present disclosure.

According to various embodiments, the above edge-aware guided filter is applied to a study of a single image haze removal. According to further embodiments, the edge-aware guided filter is capable of handling haze removal in a series of images, and further in digital video processing. FIG. 4 illustrates a flow diagram 400 of a method of haze removal of an input image according to an embodiment of the present disclosure.

In 410, an input image is provided, the input image including an image degraded by haze. Images of outdoor scenes are usually degraded by turbid medium (e.g., particles, water-droplets) in the atmosphere. Haze, fog, and smoke are such phenomena due to atmospheric absorption and scattering. The irradiance received in the image capture from the scene point is attenuated along the line of sight. Furthermore, incoming light is blended with the airlight, which is ambient light reflected into the line of sight by atmospheric particles.

According to embodiments, a model adopted to describe the formulation of a haze image is given as:

$$X_c(p) = \hat{Z}(p)t(p) + A_c(1-t(p)) \tag{15}$$

where $c \in (r, g, b)$ is a color channel index, $X_c$ is the observed intensity, which can be understood to be the input haze image, $\hat{Z}_c$ is the scene radiance, $A_c$ is the global atmospheric light, and t is the medium transmission describing the portion of the light that is not scattered and which reaches the input capture source, or camera. t(p) can be understood the depth map or the transmission map of the haze image. The objective of the haze removal is to restore $\hat{Z}$, which can be a clear, haze-free image, from the input haze image X. As can be observed, both A and t are required to be estimated in order to recover $\hat{Z}$ from the input haze image X.

In 420, an estimation of atmospheric light in the input image X is carried out. According to embodiments, Y and Y' are luminance channels of input image X and the derived scene radiance $\hat{Z}_c$ respectively. In embodiments, the atmospheric light with respect to luminance $A_y$, is based on a breakdown with respect with the color channel index. In embodiments, the atmospheric light $A_y$ is defined as $(0.299A_r + 0.584A_g + 0.117A_b)$. Further, it can be derived from the haze image model in Equation (15) that:

$$Y(p) = \hat{Y}(p)t(p) + A_y(1-t(p)) \tag{16}$$

According to various embodiments, a dark intensity channel is used in the presently proposed de-hazing or haze removal method. In using a dark intensity channel, the luminosity of portions of the input image is utilized in determining the depth map or transmission map of the haze image. Utilizing luminosity allows for the input image to be determined with respect to a grayscale analysis. This is unlike the use of, for example, a dark channel prior, in which a minimum intensity of a color channel is analyzed. It is noted that the use of the dark channel prior would limit the de-hazing application to only cater to colored pictures. Grayscale or black and white pictures would thus suffer from inadequate input information, causing the haze removal application to be of limited effectiveness.

According to various embodiments, the dark intensity channel $Y_{dark}(p)$ is defined as:

$$Y_{dark}(p) = \min_{p' \in \Omega_{\rho 2}(p)} \{y(p')\} \tag{17}$$

where the value of $\rho_2$ is selected as 7, according to embodiments, i.e. the pixel window of consideration includes a pixel radius of 7. It can thus be noted that the method of estimation of the initial value of the depth map according to present embodiments allows for an ease of calculation and is relatively light with respect to computational resources for calculation.

In embodiments, the value of $A_c$ is estimated by using $Y_{dark}(p)$. The brightest pixels in the dark intensity channel are first selected. The value of $A_c$ is then set to the value of the highest intensity of these selected pixels along each color channel in the color channel index.

In 430, an estimation of the depth map is carried out. According to various embodiments, the initial value of depth map t(p) is then computed as:

$$t(p) = 1 - \theta \frac{Y_{dark}(p)}{A_y} \tag{18}$$

where θ is a constant. According to various embodiments, the value of θ is set as 31/32. In embodiments, the value of θ can be set as substantially equal to 1. In embodiments, the value of θ can be any other suitable value for a determination of the depth map t(p).

In 440, a refinement of the depth map t(p) is carried out. According to various embodiments, the estimated depth map is filtered by an edge-aware guided filter, under the guidance of the haze image X(p). With respect to the earlier presented block diagram of a system for carrying out an edge-preserving smoothing in FIG. 2, the estimated depth map is filtered and refined with a perceptually weighted guided filter. In undertaking a haze removal application, and in carrying out a refinement of the depth map, the depth map t(p) is provided to the guided filter as the input image, while the haze image X(p) is provided to the guided filter as the guidance image.

In embodiments, a linear transformation of guidance image X(p) is carried out. Further, perceptual weights of pixels in the depth map t(p) are obtained and coupled onto a cost function of the guided filter $E(a_{p''}, b_{p''})$ during a minimization of the cost function in determining a reconstructed depth map or a refined depth map t'(p).

According to various embodiments, the regularization parameter λ is adjusted to affect the regularization term in the cost function of the perceptually weighted guided filter, to bring out an optimization of the depth map enhancement. Generally, the regularization parameter λ is fixed, or provided with a small value, for example 1/1000, in various implementations of a guided filter. In present embodiments, the regularization parameter is adapted to the image, with respect to the perceptual weight, i.e.

$$\frac{\lambda}{\Gamma_l(p'')}.$$

As such, the cost function of the guided filter can be re-written as such:

$$\sum_{p \in \Omega_\rho(p'')} \left[ (a_{p''} I(p) + b_{p''} - X(p))^2 + \frac{\lambda}{\Gamma_l(p'')} a_{p''}^2 \right] \tag{19}$$

In increasing the regularization parameter λ, the resultant effect would be that the reconstructed image would be smoother. In providing an emphasis on the regularization term, and adjusting the regularization parameter λ with respect to image content, would lead to a smoothing of the output image after filter processing.

In 450, a recovery of the scene radiance is carried out. According to embodiments, the scene radiance, or the output haze-removed image, can be recovered or determined with the following equation, which is reworked from Equation (15):

$$\hat{Z}_c(p) = \frac{X_c(p) - A_c}{t(p)} + A_c \tag{20}$$

Figure 5A:
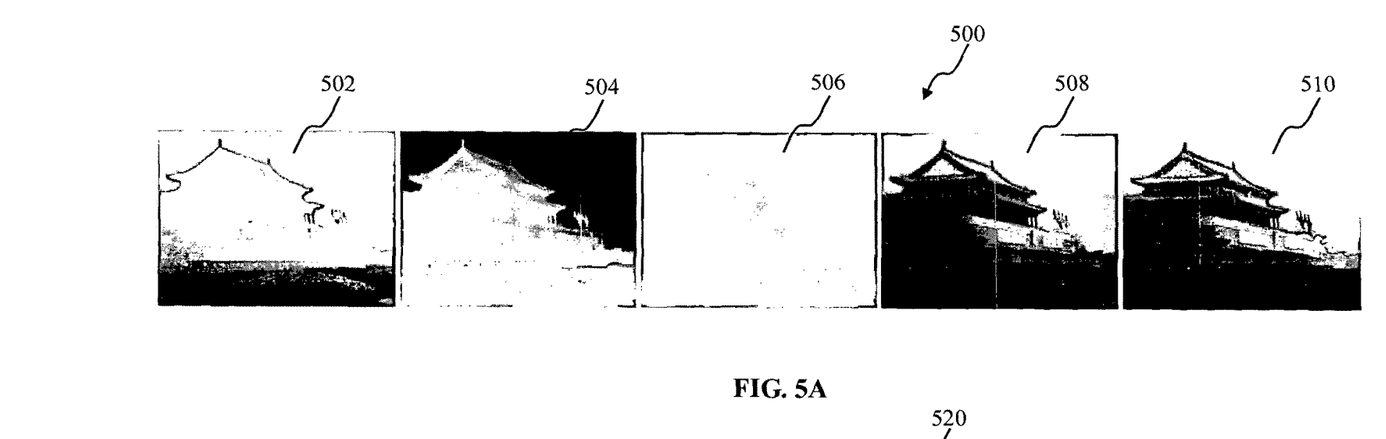
FIGS. 5A and 5B are exemplary illustrations of various steps in the haze removal application according to various embodiments.
Figure 5B:
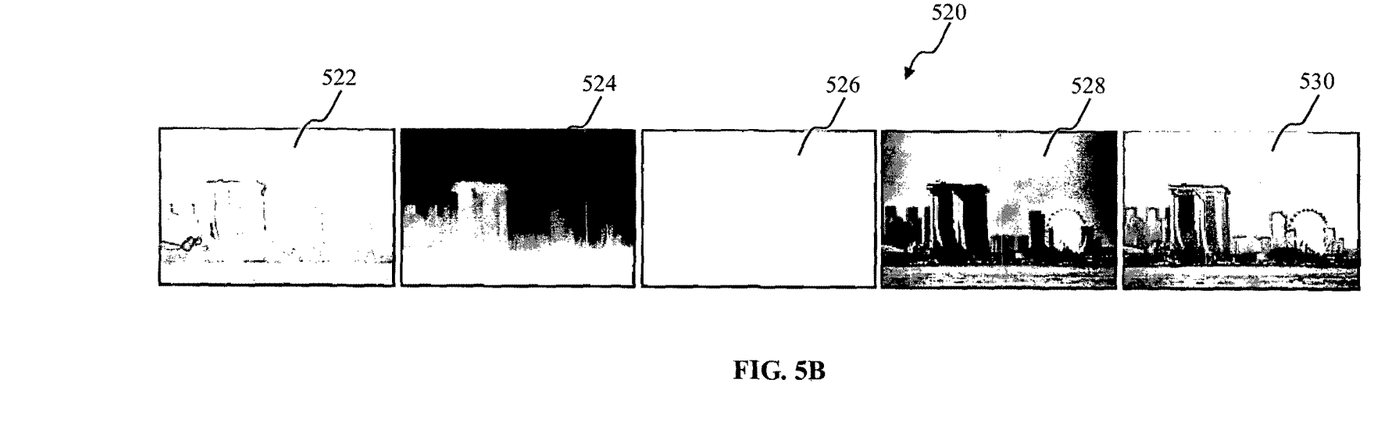

FIGS. 5A and 5B are exemplary illustrations of various steps in the haze removal application according to various embodiments. In embodiments, the value of ρ is selected as 60. Image sets 500 and 520 show results obtained with the methodology as set out in the present disclosure, and also provides a comparison with a result as obtained based on presently available methods.

Hazy input images 502, 522, are presented and put through a method of haze removal according to present embodiments, utilizing the edge-aware guided filter image processing scheme. 504, 524 are images showing refined transmission maps as obtained through using an existing method to remove haze. It is noted that in this existing method, a dark channel prior methodology is used, in which a minimum intensity of a color in the color channel is analyzed. 506 and 526 are images showing refined transmission maps as obtained with the haze removal method according to present embodiments. As described, a dark intensity channel methodology is used, in which the luminosity of the input image is analyzed.

508, 528 are images showing the de-hazed output as obtained through the existing method, while 510, 530 are images showing the de-hazed output as obtained through the haze removal method according to present embodiments. A clear difference between both sets of output images can be discerned. It is stated that since both features of structure-transferring and image smoothing of the edge-aware guided filter are utilized according to embodiments, the refined transmission maps of 506, 526 are smoother than those in 504, 524. Similarly, the final images of 510, 530 are sharper than those in 508, 528, which are obtained using the existing method. In embodiments, the running time of the edge-aware guided filter is about 40 ms for a 600×400 pixel image as compared to about 10 s for an existing method utilizing dark channel prior. Further, the present method of haze removal only requires the initial hazy picture and does not require additional information or additional images from 3D models or texture maps of the scene or satellite imagery.

According to various embodiments, an optimization can be provided for the haze removal method based on the edge-aware guided filter with respect to sky region compensation. It has been observed in experimentation that the above dark intensity channel prior is not a good prior for the sky regions. As such, there could be introduced possible artifacts in the sky regions when using the above prior. Fortunately, the color of the sky is usually very similar to the atmospheric light A in a haze image X. According to various embodiments, a non-negative sky region compensation term can be added to the sky region so as to reduce the introduction of artifacts in the sky regions.

In embodiments, a sky region compensation $S_c(p)$ is introduced to the application methodology in the initial estimation of the depth map t(p):

$$t(p) = t(p) + S_c(p) \tag{21}$$

Figure 6:
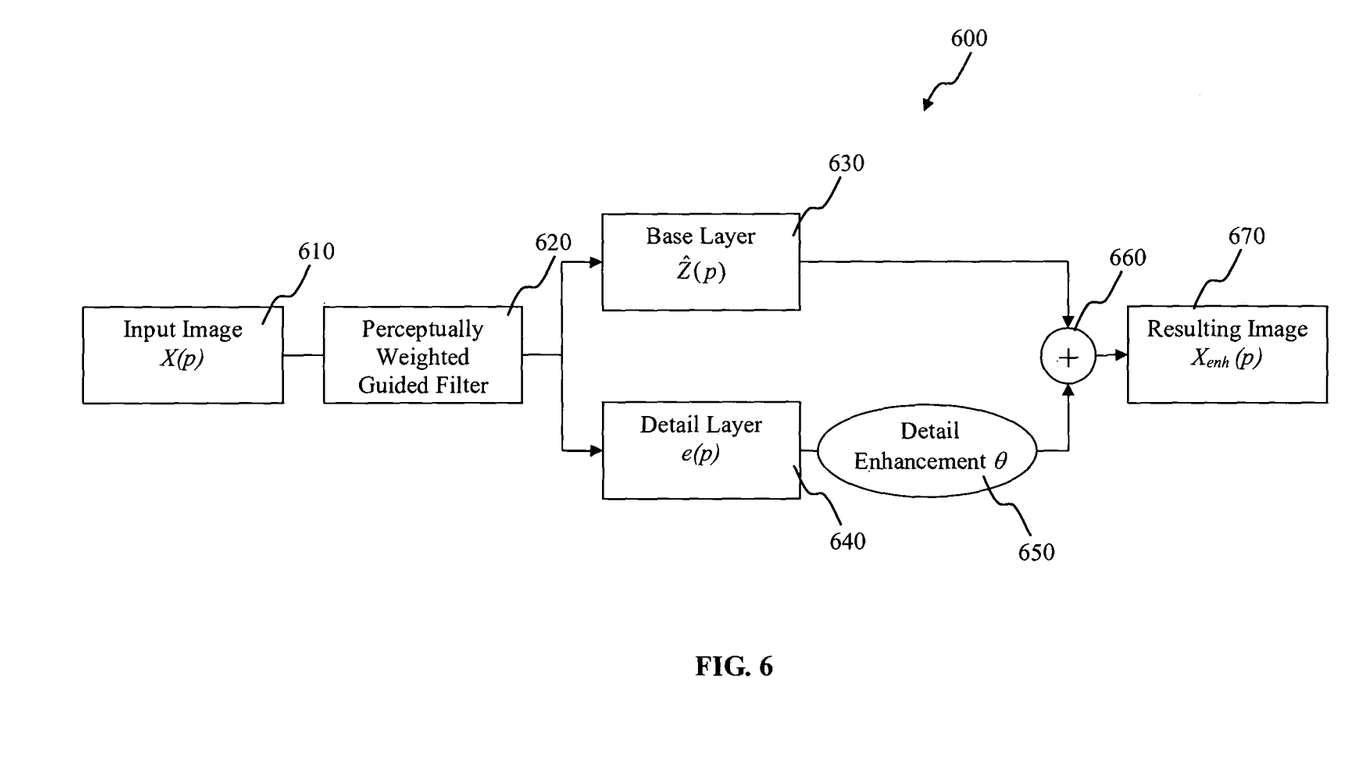
FIG. 6 illustrates a block diagram of a system for carrying out a detail enhancement of an input image.

According to various embodiments, the above presented edge-aware guided filter is applied to study detail enhancement of conventional LDR images. FIG. 6 illustrates a block diagram of a system for carrying out a detail enhancement of an input image. An input image X(p) 610 is provided to an edge-aware guided filter 620 as described above according to various embodiments. The guided filter 620 thereafter decomposes the input image X(p) 610 into a base layer portion Ẑ(p) 630 and a detail layer portion e(p) 640. Thereafter, details in the detail layer 640, for example, texture and noise, are enhanced as follows:

$$Z_{enh}(p) = \hat{Z}(p) + \theta e(p) \quad (22)$$

where θ (>θ) is a positive constant which relates to the amount of detail enhancement. In embodiments, the detail layer can be as 5, although other values may similarly apply. The base layer portion Ẑ(p) 630 and the enhanced detail layer portion θe(p) are thereafter combined with summer 660, and output as the resulting image $X_{enh}$(p) 670.

Figure 7:
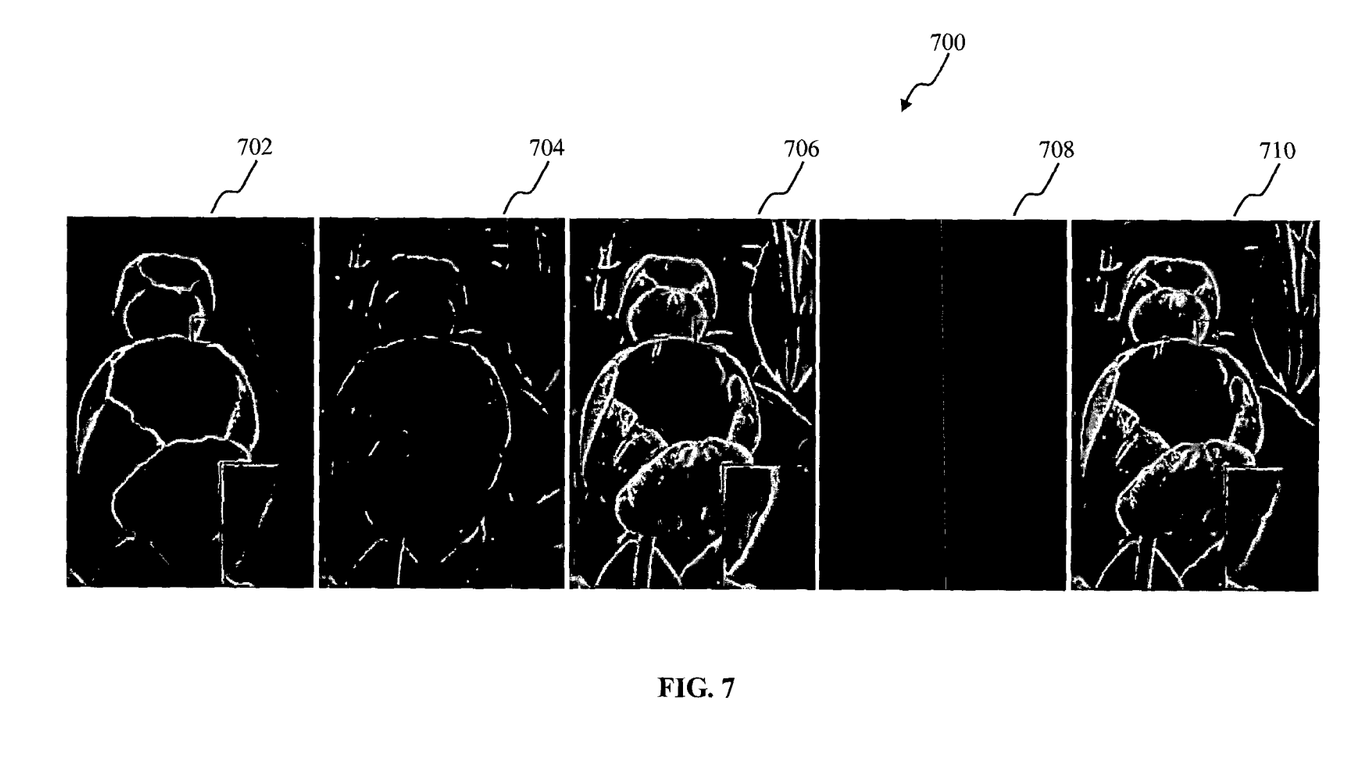
FIG. 7 is an exemplary illustration of various steps in the detail enhancement application according to various embodiments.

FIG. 7 is an exemplary illustration of various steps in the detail enhancement application according to various embodiments. Image set 700 shows results as obtained with methodology as set out in the present disclosure, and also provides a comparison with a result as obtained based on presently available methods. In an embodiment, resulting in the provided images, the value of λ is set as 1/128 and is the same for both the method as according to present embodiments and as according to an existing method. The value of ρ selected is 16.

Input images 702 is presented and put through a method of detail enhancement according to present embodiments, utilizing the edge-aware guided filter image processing scheme. 704 shows amplified detail layers as obtained through using an existing method of detail enhancement. 706 shows the enhanced image as obtained through using the existing method. 708 shows amplified detail layers as obtained with the detail enhancement application method as according to present embodiments. 710 shows the enhanced image as obtained with the detail enhancement application method as according to present embodiments.

Figure 8:
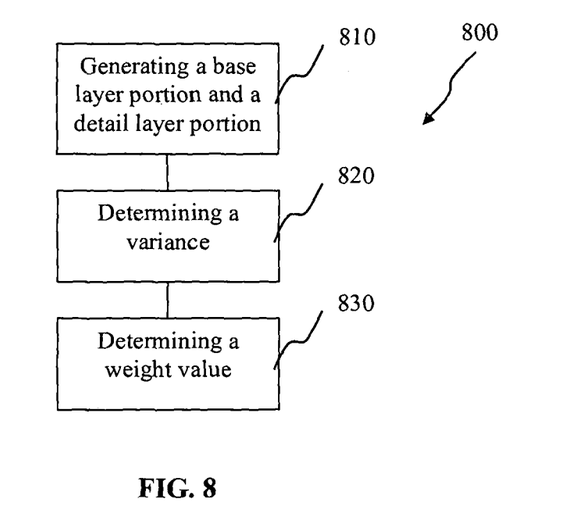
FIG. 8 illustrates a block schematic of a method of processing an input image according to an embodiment of the present disclosure.

It can be observed, that the enhanced image as obtained with the detail enhancement application method as according to present embodiments provides better visual quality when compared. Further, halo artifacts are reduced when using the detail enhancement application utilizing the edge-aware guided filter according to embodiments FIG. 8 illustrates a block schematic of a method of processing an input image according to an embodiment of the present disclosure. According to an embodiment, a method 800 of processing an input image is provided. In 810, the method includes generating a base layer portion and a detail layer portion from the input image by carrying out a linear transformation of pixels of a guidance image. In 820, the method includes determining, for each of the pixels of the guidance image, a variance of the pixel centered in a surrounding window. In 830, the method includes determining, for each of the pixels of the guidance image, a weight value of the pixel based on the determined variance, wherein the pixels are weighted in the linear transformation according to the determined weight value.

In an embodiment, the weight value is determined based on a ratio of a variance of each pixel and the variance of all the pixels in the guidance image.

In an embodiment, the weight value is larger than 1 if the pixel is an edge pixel, and smaller than 1 if the pixel is a flat pixel.

In an embodiment, the method further includes determining the weight values of all the pixels in the guidance image; and smoothing the weight values with a Gaussian filter.

In an embodiment, the method further includes minimizing a cost function of the linear transformation in carrying out the linear transformation of the guidance image, the cost function based on the guidance image and the input image.

In an embodiment, the cost function includes a data term and a regularization term, and where the weight value of the pixel is coupled to the data term to modify the fidelity of the base layer.

In an embodiment, the cost function comprises a data term and a regularization term, and where the weight value of the pixel is coupled to the regularization term to modify the smoothness of the base layer.

In an embodiment, the method further includes determining a value of reconstructed pixels from the base layer portion after carrying out the linear transformation of the pixels; and averaging the plurality of pixel values of the reconstructed pixels.

In an embodiment, the method further includes determining the input image as an initial transmission map of a haze image by using a luminance channel of the haze image, and carrying out a haze removal processing of the haze image based on the initial transmission map.

In an embodiment, determining the input image as an initial transmission map by using a luminance channel of the haze image further includes estimating an atmospheric light value in a dark intensity channel of the haze image; and determining the initial transmission map based on the atmospheric light value.

In an embodiment, the method further includes carrying out a non-negative sky region compensation during haze removal processing.

Figure 9:
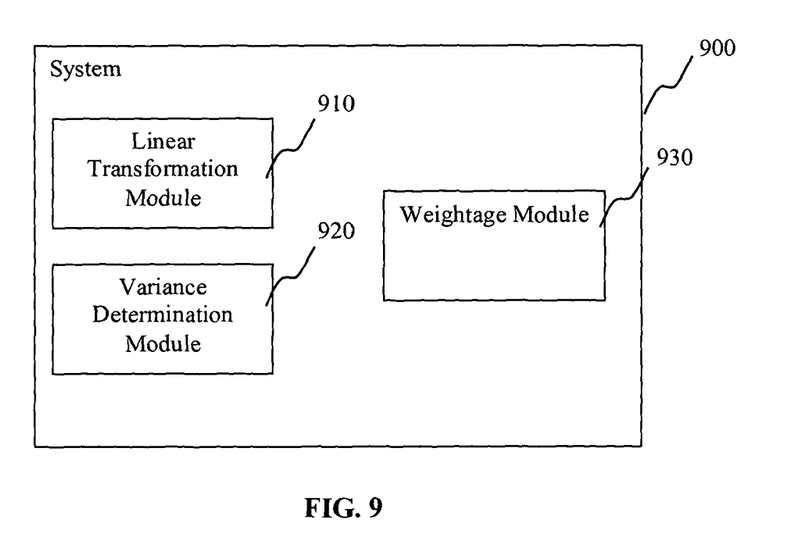
FIG. 9 illustrates a block schematic of a system for processing an input image according to an embodiment of the present disclosure.

FIG. 9 illustrates a block schematic of a system for processing an input image according to an embodiment of the present disclosure. According to an embodiment, there is provided a system for processing an input image 900. The system for processing an input image 900 includes a linear transformation module 910, configured to carry out a linear transformation of pixels of a guidance image in generating a base layer portion and a detail layer portion from the input image. According to an embodiment, the system 900 further includes a variance determination module 920 configured to determine, for each of the pixels of the guidance image, a variance of the pixel in a surrounding window of pixels. In an embodiment, the system further includes a weightage module 930 configured to determine, for each of the pixels of the guidance image, a weight value of the pixel based on the determined variance, wherein the pixels are weighted in the linear transformation according to the determined weight value.

In an embodiment, the system further includes a Gaussian filter configured to smooth the weight values of the pixels in the guidance image.

In an embodiment, the system further includes a cost function module configured to minimize a cost function of the linear transformation in carrying out the linear transformation of the guidance image, the cost function based on the guidance image and the input image.

In an embodiment, the system further includes a reconstruction module configured to determine a value of reconstructed pixels from the base layer portion after carrying out the linear transformation of the pixels, and an averaging module configured to average the plurality of pixel values of the reconstructed pixels.

In an embodiment, the system further includes an input image determination module configured to determine the input image as an initial transmission map of a haze image using the luminance channel of the haze image; and a haze removal module configured to carry out a haze removal processing of the haze image based on the initial transmission map In an embodiment, the system further includes an atmospheric light module configured to estimate an atmospheric light value in a dark intensity channel of the haze image; wherein the initial transmission map is determined based on the atmospheric light value.

In an embodiment, the system further includes a sky region compensation module configured to carry out a non-negative sky region compensation during haze removal processing.

In an embodiment, the system further includes a detail enhancement module configured to adjust the detail layer portion for better visual quality.

According to various embodiments, there is provided a computer program readable medium having a program recorded thereon, hosted on a computer processing system, where the program is executed to make a computer process an input image. In embodiments, the computer program readable medium includes instructions for generating a base layer portion and a detail layer portion by carrying out a linear transformation of pixels of a guidance image, instructions for determining a variance, and instructions for determining a weight value, wherein pixels are weighted in the linear transformation according to the determined weight value.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method for processing an input image, the input image comprising a plurality of pixels, the method comprising:
   generating a base layer portion and a detail layer portion from the input image by carrying out a linear transformation of pixels of a guidance image;
   determining, for each of the pixels of the guidance image, a variance of the pixel in a surrounding window of pixels; and
   determining, for each of the pixels of the guidance image, a weight value of the pixel based on the determined variance;
   wherein the pixels are weighted in the linear transformation according to the determined weight value, and
   wherein the method further comprises:
      determining the input image as an initial transmission map of a haze image by using a luminance channel of the haze image, comprising:
         estimating an atmospheric light value in a dark intensity channel of the haze image; and
         determining the initial transmission map based on the atmospheric light value; and
      carrying out a haze removal processing of the haze image based on the initial transmission map.

2. The method of claim 1, wherein the weight value is determined based on a ratio of a variance of each pixel and the variance of all the pixels in the guidance image.

3. The method of claim 2, wherein the weight value is larger than 1 if the pixel is an edge pixel, and smaller than 1 if the pixel is a flat pixel.

4. The method of claim 1, further comprising:
   determining the weight values of all the pixels in the guidance image; and
   smoothing the weight values with a Gaussian filter.

5. The method of claim 1, further comprising minimizing a cost function of the linear transformation in carrying out the linear transformation of the guidance image, the cost function based on the guidance image and the input image.

6. The method of claim 5, wherein the cost function comprises a data term and a regularization term, and where the weight value of the pixel is coupled to the data term to modify the fidelity of the base layer.

7. The method of claim 5, wherein the cost function comprises a data term and a regularization term, and where the weight value of the pixel is coupled to the regularization term to modify the smoothness of the base layer.

8. The method of claim 1, further comprising:
   determining a value of reconstructed pixels from the base layer portion after carrying out the linear transformation of the pixels; and
   averaging the plurality of pixel values of the reconstructed pixels.

9. The method of claim 1, further comprising carrying out a non-negative sky region compensation during haze removal processing.

10. A system for processing an input image, the input image comprising a plurality of pixels, the system comprising:
    a linear transformation module configured to carry out a linear transformation of pixels of a guidance image in generating a base layer portion and a detail layer portion from the input image;
    a variance determination module configured to determine, for each of the pixels of the guidance image, a variance of the pixel in a surrounding window of pixels; and
    a weightage module configured to determine, for each of the pixels of the guidance image, a weight value of the pixel based on the determined variance;
    an input image determination module configured to determine the input image as an initial transmission map of a haze image using the luminance channel of the haze image;
    an atmospheric light module configured to estimate an atmospheric light value in a dark intensity channel of the haze image; and
    a haze removal module configured to carry out a haze removal processing of the haze image based on the initial transmission map,
    wherein the pixels are weighted in the linear transformation according to the determined weight value; and
    wherein the initial transmission map is determined based on the atmospheric light value.

11. The system of claim 10, further comprising a Gaussian filter configured to smooth the weight values of the pixels in the guidance image.

12. The system of claim 10, further comprising a cost function module configured to minimize a cost function of the linear transformation in carrying out the linear transformation of the guidance image, the cost function based on the guidance image and the input image.

13. The system of claim 10, further comprising:
a reconstruction module configured to determine a value of reconstructed pixels from the base layer portion after carrying out the linear transformation of the pixels; and
an averaging module configured to average the plurality of pixel values of the reconstructed pixels.

14. The system of claim 10, further comprising a sky region compensation module configured to carry out a non-negative sky region compensation during haze removal processing.

15. The system of claim 10, further comprising a detail enhancement module configured to adjust the detail layer portion for better visual quality.

16. A non-transitory computer program readable medium having a program recorded thereon, wherein the program is executed to make a computer process an input image, the input image comprising a plurality of pixels, the computer readable medium comprising:
instructions for generating a base layer portion and a detail layer portion from the input image by carrying out a linear transformation of pixels of a guidance image;
instructions for determining, for each of the pixels of the guidance image, a variance of the pixel in a surrounding window of pixels; and
instructions for determining, for each of the pixels of the guidance image, a weight value of the pixel based on the determined variance;
instructions for determining the input image as an initial transmission map of a haze image using the luminance channel of the haze image;
instructions for estimating an atmospheric light value in a dark intensity channel of the haze image; and
instructions for carrying out a haze removal processing of the haze image based on the initial transmission map;
wherein the pixels are weighted in the linear transformation according to the determined weight value, and
wherein the initial transmission map is determined based on the atmospheric light value.

* * * * *